United States Patent Office 3,833,587
Patented Sept. 3, 1974

---

3,833,587
6,7,8-TRIALKYL-QUINAZOLINES HAVING A HYDROXYALKYL BEARING 4 - AMINO FUNCTION
Lloyd P. Gabel, Morris Plains, and William R. J. Simpson, Hanover, N.J., assignors to Sandoz-Wander, Inc., Hanover, N.J.
No Drawing. Application Nov. 13, 1970, Ser. No. 89,472, now Patent No. 3,637,700, which is a continuation-in-part of abandoned application Ser. No. 870,439, Dec. 5, 1969. Divided and this application Sept. 15, 1971, Ser. No. 180,762
Int. Cl. C07d 51/48
U.S. Cl. 260—256.4 Q     5 Claims

ABSTRACT OF THE DISCLOSURE

Disclosed are compounds of the class of quinazolines substituted in the benzene ring portion of the quinazoline by trialkoxy and further substituted at the 4-position by an amino function bearing a hydroxyalkyl moiety, e.g., 4-(5-hydroxypentyl)amino - 6,7,8-trimethoxyquinazoline. The compounds have pharmacological activity in animals and are useful, for example, as hypotensive, coronary dilators and antianginal agents. The compounds are prepared from the corresponding 4-haloquinazolines by known procedures and are also useful in preparation of the corresponding hydroxy nitrates which are useful, e.g., as antianginal agents.

---

This application is a division of Ser. No. 89,472, filed Nov. 13, 1970, now U.S. Letters Patent No. 3,637,700, which in turn is a continuation-in-part of Ser. No. 870,439, filed Dec. 5, 1969, now abandoned.

This invention relates to quinazoline derivatives, and more particularly to quinazolines which are substituted in the benzene ring portion thereof by three alkoxy groups and also substituted at the 4-position by an amino function bearing a hydroxyalkyl nitrate moiety. The invention also relates to pharmaceutical methods and compositions utilizing said compounds. The invention further relates to corresponding hydroxyalkyl substituted quinazolines useful as intermediates in preparation of said nitrates.

The compounds of the invention may be represented by the structural formula I:

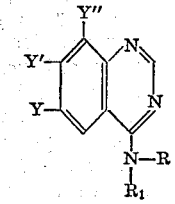

I wherein R is from the group of (a)     $-CH_2(-CH_2)_n-ONO_2$ (b)     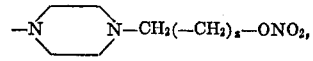

(c)     $-CH_2(-CH_2)_x-N[-CH_2(-CH_2)_y-ONO_2]_2$ $R_1$ is from the group of
  (d) $-CH_2(-CH_2)_n-ONO_2$ when R is (a) as above defined,
  (e) hydrogen, and
  (f) lower alkyl of 1 to 4 carbon atoms,
$R°$ is hydrogen, $-(CH_2-)_mCH_3$ or $-(CH_2-)_yONO_2$, provided that one $R°$ (and only one) is other than hydrogen, that the sum of $n$ and $m$ does not exceed 6 and that the sum of $n$ and $y$ does not exceed 7, or R and $R_1$ together with the 4-amino nitrogen attached to the quinazoline ring form

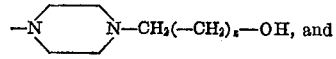

$n$ is 1 to 6, preferably 3 to 5,
$m$ is 0 to 4,
$y$ is 1 to 4,
$z$ is 1 to 4, and
each of Y, Y′ and Y″ is lower alkoxy of 1 to 3 carbon atoms, e.g., methoxy, or
a pharmaceutically acceptable non-toxic acid addition salt thereof.

A preferred method for preparation of the compounds of formula I involves in a Step A reaction the nitration of the corresponding hydroxy compound of formula II:

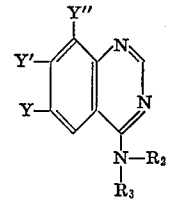

II wherein Y, Y′ and Y″ are as defined and $R_2$ and $R_3$ are the non-nitrate bearing hydroxyalkyl substituents corresponding to R and $R_1$, respectively, i.e.:

$R_2$ is from the group of:

(a)     $-CH_2(-CH_2)_n-OH$ (b)     $\left(-\overset{R_a°}{\underset{|}{CH}}\right)_n-OH$, and (c)     $-CH_2(-CH_2)_x-N[-CH_2(-CH_2)_y-OH]_2$ $R_3$ is from the group of:
  (d) $-CH_2(-CH_2)_n-OH$ when $R_2$ is (a) as above defined,
  (e) hydrogen, and
  (f) lower alkyl of 1 to 4 carbon atoms,
$R°_a$ is hydrogen, $-(CH_2-)_mCH_3$ or $-(CH_2-)_yOH$, provided that one $R°_a$ is other than hydrogen, that the sum of $n$ and $m$ does not exceed 6 and that the sum of $n$ and $y$ does not exceed 7, or
$R_2$ and $R_3$ together with the 4-amino nitrogen attached to the quinazoline ring form —N⟨  ⟩N—CH₂(—CH₂)_z—OH, and $n$, $m$, $y$ and $z$ are as defined.

The preparation of compounds I by Step A involves a nitration reaction which may be carried out in a manner known per se for nitrating hydroxyalkyl groups. A preferred method of conducting the nitration involves the reaction of a compound II with nitric acid in presence of a carboxylic acid anhydride which is preferably of from 3 to 8 carbon atoms, more preferably acetic acid anhydride. The reaction may be suitably carried out in an organic solvent medium at temperatures in the range of from minus 70° C. to 50° C., preferably 5° C. to 20° C. The solvent medium for the reaction is preferably provided by employing a lower aliphatic carboxylic acid, e.g., acetic acid, although other well known organic solvents may be employed or the reaction may be carried out employing an excess of the carboxylic acid anhydride. The product compound I may be isolated from the reaction mixture of Step A by working up by established procedures.

A preferred method for preparation of compounds II involves a Step B reaction of a 4-haloquinazoline of formula III

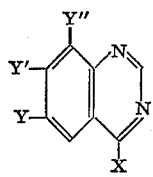

III wherein Y, Y' and Y'' are as defined and X is halo from the group of chloro or bromo, preferably chloro, with a compound of formula IV:

IV wherein $R_2$ and $R_3$ are as defined.

The reaction of Step B is of known type and may be carried out in a conventional manner by subjecting a compound III to reaction with the compound IV in an organic solvent at elevated temperatures which may be suitably in the range of 30° C. to 150° C., preferably 50° C. to 100° C. The reaction is carried out in an inert organic solvent which may be any of several of the well-known conventional solvents, preferably an aromatic solvent such as benzene. Another preferred solvent is isopropanol. Alternately, the reaction may be carried out in the inert liquid medium provided by employing an excess of compound IV. An acid binding agent such as sodium carbonate may be also employed to advantage in the reaction, if desired. The reaction product compound II may be isolated from the reaction mixture of Step B by established procedures.

The compounds of formula IV are either known or may be prepared from known materials by established procedures. The compounds of Formula III are preferably prepared by the procedure described and illustrated hereinafter in Steps A–C, inclusive, of Example 1. The compounds of formula III are novel compounds as are also the corresponding trialkoxy-quinazolin-4(3H)-ones which are preferably prepared by the procedure described and illustrated in Steps A and B of Example 1. The 2-nitro-3,4,5-trialkoxy methyl benzoates used in preparing the quinazolin-4(3H)-ones are either known or may be prepared from known materials by established procedures.

Also within the scope of the novel compounds of the invention are pharmaceutically acceptable salts not materially affecting the pharmacological effect of the compounds of formula I and formula II. Such salts include the acid addtion salts, e.g., the methane sulfonate, hydronitrate, hydrosulfate, fumarate, hydrochloride and maleate. It is convenient to prepare the compounds of formula I as a hydronitrate addition salt. Such salts may be then readily converted to the free bases by conventional procedures. In preparing the free bases from the acid addition salt it is also convenient to employ a buffer system, e.g., a system comprising a 1:1 molar mixture of acetic acid and sodium acetate, followed by working up by conventional procedures. The free bases may be readily converted into the hydronitrate and other acid addition salts by established procedures.

The compounds of formula I and their pharmaceutically acceptable acid addition salts are useful because they possess pharmacological activity in animals. In particular, the compounds are useful as hypotensive agents, as indicated by a lowering of blood pressure on intravenous administration to the anesthetized dog. The compounds of the invention are also useful as coronary dilators in the treatment of cardiac insufficiencies, as indicated on intravenous administration to the anesthetized dog and measurement of blood flow through the anterior descending branch of the left coronary artery. The compounds are further useful as antianginal agents as indicated by effecting coronary dilation in the above-indicated test and by showing a reduction of oxygen consumption and increase in coronary blood flow in the known test involving a determination of myocardial oxygen consumption in the anesthetized dog.

For the above uses, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon the compounds used, the therapy desired and the mode of administration. However, as hypotensive and coronary dilator agents, satisfactory results are obtained when administered at a daily dosage of from about 0.1 milligrams to about 50 milligrams per kilogram of body weight, preferably given in divided doses 2 to 4 times a day, or in sustained release form. For most mammals the administration of from about 6 milligrams to about 500 milligrams of the compound per day provides satisfactory results and dosage forms suitable for internal administration comprise from about 1.5 milligrams to about 250 milligrams of the compound in admixture with a solid or liquid pharmaceutical carrier or diluent.

As antianginal agents satisfactory results may be obtained when administered at a daily dosage of from 0.002 to 20 milligrams per kilogram of body weight, given as required or in divided doses or in sustained release form. For most mammals a dosage of from 0.1 to 60 milligrams, pro re nata, provides satisfactory results. The compounds may also be used prophylactically in mammals to prevent or minimize angina attacks at a daily dosage of 0.1 to 60 milligrams, or in divided doses of from 0.025 to 30 milligrams.

The compounds of Examples 1, 2b, 2d and 2z are also useful as antiarrhythmic agents, as indicated by polygraph recordings on intravenous administration to the anesthetized dog given Ouabain until the appearance of constantly-occurring ventricular ectopic beats and then the test compound every two minutes until the arrhythmia reverts to sinus rhythm. For this use satisfactory results, in general, are obtained when administered at a daily dosage of from 0.05 to 50 milligrams per kiolgram of animal body weight. For most mammals the administration of from 3 to 100 milligrams of the compound per day provides satisfactory results and divided dosage forms suitable for internal administration comprise from about 0.75 to 50 milligrams in admixture with a solid or liquid pharmaceutical carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, i.e., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules.

A representative formulation prepared by conventional techniques for encapsulation in a hard gelatin capsule is as follows:

| Ingredient: | Weight (mg.) |
|---|---|
| Compound of the formula I, e.g., a compound of Examples I, 2b, 2d, 2x or 2z, hereinafter | 11.55 |
| Lactose (spray-dried) | 151.3 |
| Collodial Silica (Cab-O-Sil) | 5.45 |
| Alginic Acid | 56.7 |

The compounds of the formula II and their pharmaceutically acceptable acid addition salts are also useful because they possess pharmacological activity in animals. In particular, the compounds are useful as hypotensive agents and as coronary dilators in the treatment of cardiac insufficiencies as indicated by the above-indicated tests in animals for these activities. Based on further evaluations of the compound produced in Step D of Example 1, it is also indicated that compounds of the formula II may be used as anti-anginal agents as indicated by effecting coronary dilation in the above-indicated test and by showing a reduction of oxygen consumption and increase in coronary blood flow in the above-referred to myocardial oxygen consumption test. Similarly, it is noted that the product of Step D of Example 1 is also indicated as useful as an anti-arrhythmic agent as indicated by the above-mentioned animal test for determining such indication. For the above uses of the compounds of formula II the dosage will vary depending upon known factors such as mode of administration and the particular compound employed. However, in general, satisfactory results are obtained at a daily dosage of from about 0.3 to about 80 milligrams per kilogram of body weight. For most mammals a daily dosage of from 20 to 600 milligrams provides satisfactory results with divided dosage forms comprising from about 5–300 milligrams, except that in the use as anti-anginal agents a dose of from 2 to 150 milligrams may be administered pro re nata. For prophylactic use of the compounds of the formula II in preventing or minimizing angina attacks a daily dosage of from 2 to 150 milligrams or divided doses of from 0.5 to 75 milligrams are indicated. The compounds of the formula II may be administered for their particular uses in the conventional forms and modes above indicated for the administration of the compounds of formula I.

The following examples show representative compounds encompassed within the scope of this invention and the manner in which such compounds are prepared. However, it is to be understood that the examples are for purposes of illustration only.

EXAMPLE 1

4-[3-Bis(2-hydroxyethyl)aminopropyl]amino-6,7,8-trimethoxyquinazoline dinitrate dimaleate

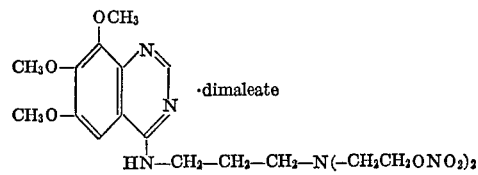

STEP A: Preparation of 2-amino-3,4,5-trimethoxy methyl benzoate

A mixture of 39 g. of 2-nitro-3,4,5-trimethoxy methyl benzoate, 100 ml. of acetic acid and 2.5 g. of 5% palladium on charcoal is shaken with hydrogen at temperature of 60° C. and a hydrogen pressure of 50 p.s.i. for 25 hours. The resulting mixture is filtered and concentrated in vacuo. The resulting residue is partitioned between methylene chloride and an excess of sodium carbonate solution. The methylene chloride solution is dried, concentrated in vacuo and the resulting oil distilled (105° C. 5×10⁻³ mm.) to obtain an oil of 2-amino-3,4,5-trimethoxy methyl benzoate.

STEP B: Preparation of 6,7,8-trimethoxy-quinazolin-4(3H)-one

A solution of 24.2 g. of 2-amino-3,4,5-trimethoxy methyl benzoate in 80 ml. of 99% formamide is refluxed for 1¼ hours. The reaction mixture is then cooled, 200 ml. of ice water is added, and the solid material is separated by filtering, washed with water and dried to obtain 6,7,8-trimethoxy-quinazolin-4(3H)-one, m.p. 220–222° C.

STEP C: Preparation of 4-chloro-6,7,8,-trimethoxy-quinazoline

A mixture of 11.6 g. of 6,7,8-trimethoxy-quinazolin-4(3H)-one and 40 ml. of phosphorous oxychloride is refluxed for 20 minutes. The reaction mixture is cooled, and added to an excess of dilute ammonia solution at 0° C. The resulting mixture is shaken at 0° C. with 350 ml. of chloroform and the organic phase is then dried and passed through silica gel. The solvent is removed in vacuo to obtain 4-chloro-6,7,8-trimethoxy-quinazoline, m.p. 110° C.

STEP D: Preparation of 4-[3-bis(2-hydroxyethyl)amino-propyl]amino-6,7,8-trimethoxy-quinazoline A mixture of 6 g. of 4-chloro-6,7,8-trimethoxy-quinazoline, 4.2 g. of bis(2-hydroxyethyl)aminopropyl-amine and 3.5 g. of sodium carbonate is heated in 50 ml. of refluxing isopropanol for 35 minutes. The reaction mixture is then filtered, solvent removed in vacuo and the crystalline residue recrystallized from ethyl acetate to obtain 4-[3-bis(2-hydroxyethyl)aminopropyl]amino-6,7,8-trimethoxyquinazoline, m.p. 142.5–144° C.

STEP E: Preparation of 4-[3-bis(2-hydroxyethyl)amino-propyl]amino - 6,7,8 - trimethoxy-quinazoline dinitrate dimaleate A solution of 6.42 g. of 4 - [3 - bis(2 - hydroxyethyl) aminopropyl]amino - 6,7,8-trimethoxy-quinazoline in 30 ml. of glacial acetic acid is added over a period of 6 minutes dropwise to a stirred cooled (3–10° C.) mixture of 14.2 ml. of acetic anhydride and 4.73 ml. of 90% nitric acid. Stirring is continued for 5 minutes after addition and the resulting mixture added to 300 ml. of a buffer system comprising a 1:1 molar mixture of acetic acid solution and sodium acetate solution. The resulting mixture is extracted three times each with 200 ml. of ethyl acetate, washed with excess of sodium carbonate solution at temperature of 5° C., dried and concentrated in vacuo to obtain a solid which is treated with a solution of 3.08 g. of maleic acid in 25 ml. of ethanol. The resulting mixture is concentrated in vacuo to obtain a solid material which is filtered off, washed with cold (0° C.) ethanol, dried and recrystallized from methanol to obtain 4-[3-bis(2-hydroxyethyl)aminopropyl]amino - 6,7,8-trimethoxy-quinazoline dinitrate dimaleate, m.p. 107° C. (decomp.). Following the same procedure but employing hydrogen chloride in place of the maleic acid, there is readily prepared the dihydrochloride salt, m.p. 146° C. (decomp.).

EXAMPLE 2

Following the procedures of Example 1 there is obtained (a) 4-(6-hydroxyhexyl)amino-6,7,8-trimethoxyquinazo-line, m.p. 143–144° C. (Crystallization from ethyl acetate).

(b) 4-(6-hydroxyhexyl)amino-6,7,8-trimethoxyquinazo-line nitrate maleate, m.p. 106–107° C. (Crystallization from ethanol/diethyl ether).

(c) 4-(5-hydroxypentyl)amino-6,7,8-trimethoxyquinazoline, m.p. 143-144° C. (Crystallization from ethyl acetate).
(d) 4-(5-hydroxypentyl)amino-6,7,8-trimethoxyquinazoline nitrate maleate, m.p. 110° C. (decomp.). (Crystallization on addition of diethyl ether to oily product).
(e) 4-(4-hydroxybutyl)amino-6,7,8-trimethoxyquinazoline, m.p. 174-174.5° C. (Crystallization from ethyl acetate).
(f) 4-(4-hydroxybutyl)amino-6,7,8-trimethoxyquinazoline nitrate maleate, m.p. 114-115° C. (Crystallization from methanol/diethyl ether and recrystallized from ethanol).
(g) 4-[4-(2-hydroxyethyl) 1-piperazino]-6,7,8-triethoxyquinazoline, m.p. 100-102 ° C.
(h) 4-[4-(2-hydroxyethyl)-1-piperazino]6,7,8-triethoxyquinazoline nitrate dihydrochloride, m.p. 170° C. (decomp.).
(i) 4-(5-hydroxypentyl)amino-6,7,8-triethoxyquinazoline, m.p. 109-110.5° C.
(j) 4-(5-hydroxypentyl)amino-6,7,8-triethoxyquinazoline nitrate hydronitrate, m.p. 78-79° C.
(k) 4-[3-bis(2-hydroxyethyl)aminopropyl]amino-6,7,8-triethoxyquinazoline, m.p. 93-94° C.
(l) 4-[3-bis(2-hydroxyethyl)aminopropyl]amino-6,7,8-triethoxyquinazoline dinitrate dihydrochloride, m.p. 130° C. (decomp.).
(m) 4-[3-bis(3-hydroxypropyl)aminopropyl]amino-6,7,8-trimethoxyquinazoline, m.p. 117-118° C.
(n) 4-[3-bis(3-hydroxypropyl)aminopropyl]amino-6,7,8-trimethoxyquinazoline dinitrate, m.p. 120-121° C. (decomp.).
(o) 4-[4-bis(2-hydroxyethyl)aminobutyl]amino-6,7,8-trimethoxyquinazoline, m.p. 159-160° C.
(p) 4-[4-bis(2-hydroxyethyl)aminobutyl]amino-6,7,8-trimethoxyquinazoline dinitrate dihydrochloride, hydroscopic and no melting point obtained.
(q) 4-(4-hydroxymethyl-5-hydroxypentyl)amino-6,7,8-trimethoxyquinazoline, m.p. 155-160° C.
(r) 4-(4-hydroxymethyl-5-hydroxypentyl)amino-6,7,8-trimethoxyquinazoline dinitrate hydronitrate, m.p. 114.5-115° C.
(s) 4-N-methyl-N-[3-bis(2-hydroxyethyl)aminopropyl] amino-6,7,8-trimethoxyquinazoline, m.p. 89-91° C.
(t) 4-N-methyl-N-[3-bis(2-hydroxyethyl)aminopropyl] amino-6,7,8-trimethoxyquinazoline dinitrate fumarate, m.p. 79-81° C.
(u) 4-di(2-hydroxyethyl)amino-6,7,8-trimethoxyquinazoline, m.p. 110-113° C.
(v) 4-di(2-hydroxyethyl)amino-6,7,8-trimethoxyquinazoline dinitrate hydronitrate, m.p. 121-122° C. (decomp.).
(w) 4-(2,3-dihydroxypropyl)amino-6,7,8-trimethoxyquinazoline, m.p. 185-186° C.
(x) 4-(2,3-dihydroxypropyl)amino-6,7,8-trimethoxyquinazoline dinitrate maleate, m.p. 139-140 ° C.
(y) 4-[2-bis(2-hydroxyethyl]aminoethyl]amino-6,7,8-trimethoxyquinazoline, m.p. 153-154° C.
(z) 4-[2-bis(2-hydroxyethyl)aminoethyl]amino-6,7,8-trimethoxyquinazoline dinitrate dihydrochloride, m.p. 136° C. (decomp.)

What is claimed is:

1. A compound of the formula:

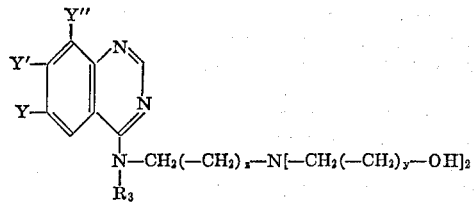

in which each of Y, Y' and Y" is alkoxy of 1 to 3 carbon atoms, $R_3$ is hydrogen or alkyl of 1 to 4 carbon atoms, $z$ is 1 to 4 and $y$ is 1 to 4, or a pharmaceutically acceptable non-toxic acid addition salt thereof.

2. The compound of claim 1 in which $z$ is 2 and $y$ is 1, Y, Y' and Y" are methoxy and $R_3$ is hydrogen.

3. The compound of claim 1 in which $z$ is 1 and $y$ is 1, Y, Y' and Y" are methoxy and $R_3$ is hydrogen.

4. The compound 4 - (2,3 - dihydroxypropyl)amino-6,7,8-trimethoxyquinazoline, or a pharmaceutically acceptable non-toxic acid addition salt thereof.

5. The compound 4-[4 - (2 - hydroxyethyl) - 1 - piperazino]-6,7,8-triethoxyquinazoline, or a pharmaceutically acceptable non-toxic acid addition salt thereof.

References Cited

UNITED STATES PATENTS 3,517,005  6/1970  Cronin et al. _____ 260—256.4

RAYMOND V. RUSH, Primary Examiner